Figure 1:
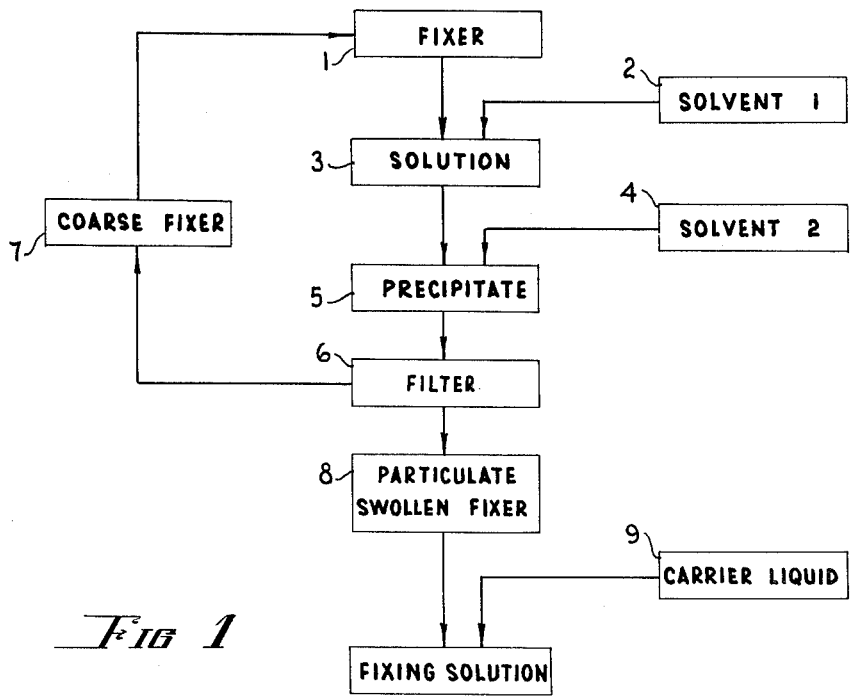

March 22, 1966 K. M. OLIPHANT 3,241,998

METHOD OF FIXING XEROGRAPHIC IMAGES

Filed July 3, 1961

INVENTOR.
Keith Meredith Oliphant
BY
Wallace, Kenjer and Dorn
ATTORNEYS

United States Patent Office 3,241,998
Patented Mar. 22, 1966

3,241,998
METHOD OF FIXING XEROGRAPHIC IMAGES
Keith Meredith Oliphant, Westbourne Park, South Australia, Australia, assignor to Research Laboratories of Australia Limited, Adelaide, South Australia, Australia
Filed July 3, 1961, Ser. No. 121,651
Claims priority, application Australia, July 12, 1960, 62,470/60; July 14, 1960, 62,567/60
6 Claims. (Cl. 117—37)

This invention relates to an improved method and means for fixing electrically deposited coatings to surfaces and in particular it relates to the fixing of coatings to xerographic papers and the like, where a coating of pigment or similar substance must be preferentially deposited on to a surface and rapidly and effectively bonded thereto.

It is already known to coat surfaces either uniformly or image-wise by electrical deposition, according to which method the materials to be deposited are suspended in an electrically insulating liquid and are moved to the deposition site by a field induced through the coating material, such as for instance by the latent electrostatic image on the surface of a photoconductive printing element immersed within the liquid.

Problems existed in fixing such a coating to the surface, and according to a known method the particles of the coating material are covered with a film of a fixing agent by pre-grinding therewith, and this film is then kept in a tacky state by being suspended in a solvent for the material.

One of the problems with the known method is that the fixing material, as it is dissolved from the particles, can lower the electrical resistivity of the suspending medium and can therefor affect the actual deposition.

By a careful selection of the correct bonding medium and suspending liquid, it has been possible to effectively bond particles to a surface, and therefore the known methods do provide means of moving particles on to a surface and immediately bonding them thereto, but the object of this invention is to provide certain improvements to the method of bonding substances such as pigments to paper of other backing, one of the objects being to allow the quantity of the bonding medium to be selected in relation to the medium which is to be bonded to the surface, another object being to so arrange the bonding medium that destruction or lowering of the volume resistivity of the suspending liquids does not take place to any material degree.

Basically the objects are achieved by co-depositing the pigment, or other materials which are to be bonded to the surface, and which will be termed the "coating" material, with a bonding medium, the bonding medium, however, being of separate particulate form and being in a condition where it can act as a bonding medium but itself is insoluble in the carrier liquid.

By making the bonding medium a separate phase and by having it insoluble in the carrier liquid, there is no problem due to dissolving out of the bonding medium into the carrier liquid with consequent possible lowering of the insulation value of the liquid, and also as the bonding medium is separately carried and deposited, deposition can be much more readily controlled in that a quantity of bonding medium in relation to the coating material can be readily varied, and also the bonding medium can be made to deposit more heavily or more lightly than the coating material, again depending on a selection of the electrical characteristic of the bonding medium and similar factors.

When the expression "co-deposited" is used it is to be realised that the bonding medium could be carried in a separate carrier liquid from the coating material, and a two-stage process could be used in which the bonding medium would first be deposited on to the surface and then the coating material would be deposited on top of this or vice versa, in which case, of course, the electrical characteristic of the two materials can differ because the field can be varied in the two stages of the deposition.

One of the essentials according to this invention is to prepare the bonding medium in such a way that it is swollen or dissolved in on true solvent medium and then introduced in such form into another lesser solvent medium which causes precipitation of the required fineness, the selection of these media preferably being such that the particles finish with a degree of softening due to swelling caused through the one true solvent which will be maintained during deposition, but the particles are then in a state where, although they are not soluble in the carrier liquid from which they are subsequently deposited, the true solvent contained in the particles may itself at least partly come out into the carrier liquid but if the solvent has the required electrical resistivity, destruction of the insulating property of the carrier liquid does not take place, yet the amount of true solvent within the particles will ensure that the particles are in a condition where, immediately they are deposited and the covering liquid such as the carrier liquid is removed, they will act as a bonding medium and will fix the co-deposited coating material in position when contacted therewith.

It will be realised that, in the case of xerographic images, where coating deposition must vary image-wise, the amount of fixing medium deposited can be independent of the pigment deposited because both, although they may be co-deposited, are independent entities which can be deposited separately from the liquid on to the xerographic image.

In this way it is possible to have a more rapid or heavier deposition of the fixing medium over the image areas so that in effect the coating material can be deposited thereonto and immediately held in position by the fixing medium.

Instead of incorporating the fixing medium with the developer itself, it may be used separately, in which case the developer can first be applied to the image areas and the developed image then immediately subjected to the fixing bath before the xerographic image is destroyed by light or other factors.

Similarly the xerographic image could first be subjected to the fixing medium and then immediately placed into contact with the developer, again before the xerographic image is destroyed by light or other factors.

The following examples show how the fixer is formed and how the invention is applied.

The drawing designated FIG. 1 is a flow sheet showing how the fixing medium is prepared.

Figure 2:
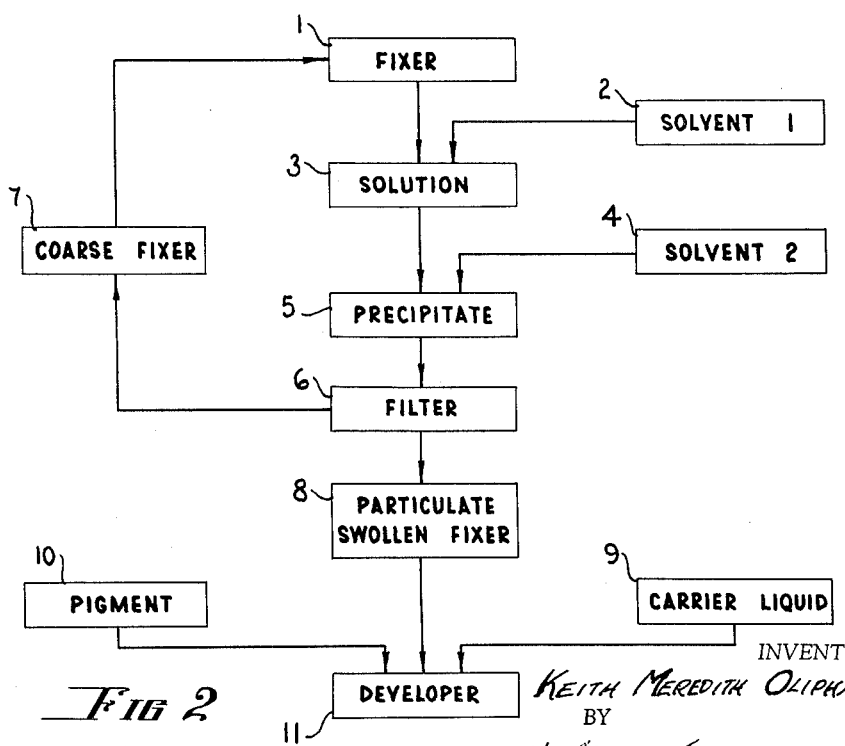

The drawing designated FIG. 2 is a flow sheet showing how a developer is prepared.

The method of using the fixing medium can be varied but the invention is described herein with reference to the examples in which;

Examples 1, 2, 3, 4, and 5 describe developers including fixing media for image-wise simultaneous deposition, Example 6 describes a fixer for image-wise pre-deposition, and Example 7 describes a developer for image-wise deposition with a subsequently deposited fixer.

PREPARATION OF FIXING MEDIUM

Referring now to FIG. 1, the method of preparing the fixing medium can of course, be varied but as an example an epoxy ester resin fixer 1 can be dissolved in a solvent 2 which is a true solvent for such resin such as toluene or benzine to form a solution 3 to which is then added two volumes of a second lesser solvent 4 such as mineral turpentine. Heat blending produces a particulate swollen fixer 5 in excess solvent. The filter 6 removes the coarse precipitated fixer 7 which is returned to the fixer 1, while the particulate swollen fixer 8 is combined with a non-solvent carrier liquid 9 to form the fixing suspension for use as in Examples 6 and 7.

Referring now to FIG. 2, the particulate swollen fixer 8 can be combined with a non-solvent carrier liquid 9 and a pigment 10 to form the developer 11. The carrier liquid 9 may be miscible with the second solvent 4.

The result is that small swollen particles of the resin are suspended in the carrier liquid together with the pigment but as separate entities.

It will be realised that when a true and a lesser solvent, or differential solvents, are used, precipitation of the solids will take place, the fineness of the precipitation being controlled by the particular combination of solvents.

From the foregoing it will be realized that, contrary to the method used heretofore the bonding medium is a separate entity which is separately deposited either at the time the developer pigment is deposited or at a separate period either before or after the deposition of the developer.

As previously stated, this allows a better selection of the quantity of fixing medium, the only requirement being that the fixing medium must, if it is to be simultaneously deposited, be of the same electrical polarity as the developer, so that deposition will take place in the same areas.

It will also be realised that when a fixing medium is deposited in this way, deposition may take place on the same areas as the pigment while unpigmented areas can likewise be left completely free of fixing medium, but as the fixing medium can be varied in its proportion and characteristic, a simultaneous overall coverage of fixing medium is also possible, although perhaps in varying depth according to the electrostatic image, it being possible to have sufficient fixing medium to cause adsorption or other factors to deposit on those areas where the image itself would not normally be developed due to the absence of an electrostatic field at such areas.

The examples which show how the invention can be applied are as follows:

*Example 1*

The epoxy ester resin marketed under the trademark "Epidene E199/50" of the Polymer Corporation, having the following characteristics:

| | |
|---|---|
| Type of oil | Coconut |
| Oil length | 28% |
| Acid number | 3 max. |
| Solvent | Aromatic |
| Sp. gr. | 0.970–0.980 | was heated to remove the greater portion of the aromatic solvent which was a true solvent for the resin and then digested in mineral turpentine to a concentration of 1 grm. resin to 10 grms. mineral turpentine which was a lesser solvent for the resin whereby a resin suspension was obtained. This was added with agitation to a suspension of a black developer in the proportion of 1 ml. resin sol. to 200 ml. developer suspension.

The black developer was prepared as follows:

| | Grms. |
|---|---|
| Carbon black, such as "Dixie BB" (Anchor Chemical Co.) | 100 |
| Resin rhodene L45/60 | 100 |
| Mineral turpentine | 40 |

The components were ground together in a ball mill to effect coating of the pigment with the control resin, which confers a positive charge on the pigment particles when they are suspended in an aliphatic hydrocarbon carrier liquid, such as n-hexane which is a lesser solvent for the fixing medium Epidene E199/50.

"Rhodene L45/60" is a safflower oil modified alkyd resin of medium oil length marketed by Polymer Corporation Ltd., of the following properties:

| | |
|---|---|
| Oil length | 50% |
| Acid value | 6–10 |
| Sp. gr. | 0.940–0.950 |

The result was a positive fixed image with simultaneous fixed deposition.

*Example 2*

The epoxy ester resin of Example 1 was substituted by a further epoxy ester resin as sold under the trademark "Epidene E168/50" of the Polymer Corporation.

This is a similar resin to the resin of Example 1 but is based on tall oil instead of coconut oil. It is used in the same way excepting that cumene is substituted for the mineral turpentine as the lesser solvent for the resin.

*Example 3*

The styrenated alkyd as solid under the trademark "Scopol 8IX" by Styrene Copolymers Ltd. having the following characteristics:

| | |
|---|---|
| Styrene content | 30%. |
| Oil length | 34%. |
| Oil type | Linseed/wood/rosin acids. |
| Acid value | 5–9. |
| Sp. gr. 20° C. | 0.982±.005. | was heated to drive off most of the original solvent, in this case xylol and was then dissolved in mineral turpentine as the true solvent to give a two-in-one solution. The resulting solution was added to a blue developer with vigorous agitation.

The developer was as follows:

| | Grms. |
|---|---|
| Phthalocyanine blue | 100 |
| Resin "Plaskon ST873" | 100 |

These components were milled together in a ball mill to coat the pigment particles with resin. This confers a positive polarity on the particles when they are suspended in a hydrocarbon carrier liquid such as cyclohexane which is a non-solvent for the fixing medium, following which the fixing material is added as mentioned in the proportions 4 ml. additive to 200 ml. developer.

"Plaskon ST873" is a silicone alkyd resin manufactured by Allied Chemical and Dye Corporation, and has the following characteristics: 60% non-volatile matter, acid value 2–6, Gardner Holt Viscosity T–W.

This was found to give a good fixed image.

*Example 4*

The Alkyd modified acrylic resin sold under the trademark "Lustrasol 4280–50" by Reichold Chemical Industries having the following characteristics:

| | |
|---|---|
| Acid No. | 7 max. |
| Sp. gr. | 0.977–0.987. |
| Type of oil | Semi-oxidising. | was heated to drive off most of the original solvent (xylol) and then dissolved in mineral turpentine as the true solvent in the proportion of 1 grm. resin to 5 grams. turpentine.

5 ml. of this solution was added to 200 ml. of the blue developer referred to in Example 3 and gave a positive fixed image.

*Example 5*

The resin known under the trademark "Rhodene L49/60" by Polymer Corporation, having the following characteristics:

| | |
|---|---|
| Oil length | 40% |
| Solvent | Toluol |
| Acid value | 15–20 |
| Sp. gr. | 1.01–1.03 | was processed as before, that is, the greater part of the original solvent was boiled off and benzine as a true solvent was added to make a one-in-five solution.

This was then added with agitation to a red developer in proportion 1 part of solution to 50 parts of developer. The red developer was as follows:

| | Grms. |
|---|---|
| "Irgalite Crimson SC" (a rubine toner manufactured by Geigy Ltd.) | 5 |
| Silicone resin "R671" | 10 |

These components are milled together to achieve coating of the pigment particles with resin, and the resultant paste suspended in n-heptane which is a non-solvent for the fixing medium in the proportions 1 part paste to 100 parts carrier liquid to give a developer of positive polarity and high intensity. The fixer was then added in the above proportions.

"R671" is a non-drying silicone resin of high dielectric strength manufactured by the Dow Chemical Corporation of Michigan, U.S.

This gave a positive fixed image.

*Example 6*

A pre-depositing image-wise deposited fixer that can be used as a pre-wash immediately prior to development of the image can be formulated using polystyrene as the precipitated fixing medium. In this instance the charged and exposed sheet is immersed in the pre-wash for a very short time, maximum half-second, in order that there should still be unsatisfied surface charge on the sheet which is capable of attracting the developer pigment. In this way a controlled amount of fixing medium can be applied while still leaving enough charge for satisfactory image densities to be obtained in the development step. Formulation of the fixer for this purpose is as follows:

50 grms. polystyrene is hot dissolved in a mixture of 50 ml. xylene and 150 ml. mineral turpentine, as the true solvents, and the mixture cooled. A further 150 ml. xylene and 250 ml. mineral turpentine is then added. 650 ml. "Shell solvent X55" as a lesser solvent is then added with stirring and the precipitate formed is removed by filtration. The filtrate forms the fixing medium. For use as a fixing bath 20 ml. of additive is diluted with 80 ml. "Shell solvent X55" as the non-solvent carrier liquid which causes precipitation of resin in particulate fine form.

*Example 7*

A subsequently depositing image-wise deposited fixer can be formulated as in example 6, and used as an immediate post development wash, provided development of the image was not carried to completion, using any of the developers of the preceding examples. For example provided the development time for dish development is limited to 5 seconds or less, sufficient charge will remain on the surface after development to allow imagewise deposition of fixing medium in an immediate post washing step. Advantageously the development time can be adjusted to allow greater or lesser amounts of charge to remain unsatisfied and consequently greater or lesser amounts of fixing medium to be deposited subsequently. Thus the degree of scuff resistance obtained is under very fine control.

What I claim is:

1. The method of fixing image deposits to an electrostatic charge image of given polarity on an electrophotographic surface which comprises first dissolving a resinous fixing medium that is attractable to an electrostatic charge of said given polarity in a solvent therefor, precipitating such fixing medium by addition to the solution of a liquid which causes precipitation of the fixing medium in particulate form but in softened condition due to the retention of some of the solvent, suspending the softened particulate resinous fixing medium in a carrier liquid which is a non-solvent for such particulate fixing medium and which has an electrical volume resistivity of at least $10^9$ ohm cm. and a dielectric constant of less than three, whereby said particulate fixing medium may be deposited on charge portions of said image of said given polarity, suspending a particulate developer pigment that is attractable to an electrostatic charge of said given polarity in the carrier liquid, applying the resulting suspension to said surface to co-deposit said particulate developer pigment and said particulate resinous fixing medium on said charge image, and thereafter evaporating said carrier liquid and the solvent contained in said resinous fixing medium particles to adhere said fixing medium and said developer pigment to said surface.

2. The method of fixing images on an electrophotographic surface as claimed in claim 1 wherein the resinous fixing medium is one selected from the group consisting of an epoxy ester resin, a styrenated alkyd resin, an acrylic alkyd resin, a safflower oil modified alkyd resin and polystyrene.

3. The method of fixing image deposits to an electrostatic charge image of given polarity on an electrophotographic surface which comprises applying a particulate developer pigment, attracted to a charge of said polarity, to said surface to deposit pigment particles on said image and thereby develop said image, stopping said image development before the electrostatic image charge has been fully satisfied, then subjecting said image to a liquid suspension of a particulate resinous fixing medium which is also attracted to a charge of said polarity and which is formed by first dissolving a resinous fixing medium in a solvent therefor, precipitating such fixing medium by addition to the solution of a liquid which causes precipitation of the fixing medium in particulate form but in softened condition due to the retention of some of the solvent, suspending the softened particulate resinous fixing medium in a carrier liquid which is a non-solvent for such particulate fixing medium and which has an electrical volume resistivity of at least $10^9$ ohm cm. and a dielectric constant of less than three, whereby said particulate fixing medium is deposited on said charge image on said electrophotographic surface, and thereafter evaporating said carrier liquid and the solvent contained in said resinous fixing medium particles to adhere said fixing medium and said pigment to said surface.

4. The method of fixing images on an electrophotographic surface as claimed in claim 3 wherein the resinous fixing medium is one selected from the group consisting of an epoxy ester resin, a styrenated alkyd resin, an acrylic alkyd resin, a safflower oil modified alkyd resin and polystyrene.

5. The method of fixing image deposits to an electrostatic charge image of given polarity on an electrophotographic surface which comprises first dissolving a resinous fixing medium that is attractable to an electrostatic charge of said given polarity in a solvent therefor, precipitating such fixing medium by addition to the solution of a liquid which causes precipitation of the fixing medium in particulate form but in softened condition due to the retention of some of the solvent, suspending the softened particulate resinous fixing medium in a carrier liquid which is a non-solvent for such particulate fixing medium and which has an electrical volume resistivity of at least $10^9$ ohm cm. and a dielectric constant of less than three, applying the resulting suspension to said electrophotographic surface whereby said particulate fixing medium is deposited on said charge image on said surface, stopping the depositing of said fixing medium before the electrostatic image charge has been fully satisfied, then applying a particulate developer pigment, attracted to a charge of said polarity, to said surface to deposit pigment particles on said image and thereby develop said image, and thereafter evaporating said carrier liquid and the solvent contained in said resinous fixing medium particles to adhere said fixing medium and said pigment to said surface.

6. The method of fixing images on an electrophotographic surface as claimed in claim 5 wherein the resinous fixing medium is one selected from the group consisting of an epoxy ester resin, a styrenated alkyd resin, an acrylic alkyd resin, a safflower oil modified alkyd resin and polystyrene.

References Cited by the Examiner

UNITED STATES PATENTS

| | | | |
|---|---|---|---|
| 2,829,982 | 4/1958 | Hoyt | 117—100 |
| 2,851,408 | 9/1958 | Cerulli | 204—181 |
| 2,891,911 | 6/1959 | Mayer et al. | 117—37 |
| 2,898,279 | 8/1959 | Metcalfe et al. | 204—181 |
| 2,899,335 | 8/1959 | Straughan | 117—37 |
| 2,919,247 | 12/1959 | Allen | 252—62.1 |
| 2,940,934 | 6/1960 | Carlson | 252—62.1 |
| 2,965,573 | 12/1960 | Gundlach | 252—62.1 |
| 3,053,688 | 9/1962 | Grieg | 96—1 |
| 3,058,914 | 10/1962 | Metcalfe et al. | 252—62.1 |
| 3,065,204 | 11/1962 | Dietrich et al. | 260—33.6X |
| 3,078,231 | 2/1963 | Metcalfe et al. | 252—62.1 |
| 3,078,244 | 2/1963 | Bibolet et al. | 260—33.6X |
| 3,080,250 | 3/1963 | Claus | 117—17.5 |
| 3,090,755 | 5/1963 | Erchak et al. | 252—62.1 |

WILLIAM D. MARTIN, *Primary Examiner.*

M. TILLMAN, J. R. SPECK, *Examiners.*